(12) United States Patent
Fux et al.

(10) Patent No.: US 8,395,586 B2
(45) Date of Patent: Mar. 12, 2013

(54) METHOD OF LEARNING A CONTEXT OF A SEGMENT OF TEXT, AND ASSOCIATED HANDHELD ELECTRONIC DEVICE

(75) Inventors: Vadim Fux, Waterloo (CA); Sergey Kolomiets, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1421 days.

(21) Appl. No.: 11/427,971

(22) Filed: Jun. 30, 2006

(65) Prior Publication Data

US 2008/0002885 A1 Jan. 3, 2008

(51) Int. Cl.
*G09G 5/00* (2006.01)
(52) U.S. Cl. .......................... 345/171; 345/168; 345/169
(58) Field of Classification Search .......... 345/168–171; 341/22–28; 708/142–146
See application file for complete search history.

(56) References Cited

U.S. PATENT DOCUMENTS

| | | | | |
|---|---|---|---|---|
| 5,128,672 A * | 7/1992 | Kaehler | ............................ | 341/23 |
| 5,270,927 A * | 12/1993 | Sproat | ............................ | 715/264 |
| 5,945,928 A * | 8/1999 | Kushler et al. | .................. | 341/28 |
| 6,204,848 B1 * | 3/2001 | Nowlan et al. | ................. | 715/810 |
| 6,286,064 B1 * | 9/2001 | King et al. | ....................... | 710/67 |
| 6,307,548 B1 * | 10/2001 | Flinchem et al. | ............. | 715/811 |
| 6,346,894 B1 * | 2/2002 | Connolly et al. | ............... | 341/22 |
| 6,646,573 B1 * | 11/2003 | Kushler et al. | .................. | 341/28 |
| 6,760,012 B1 * | 7/2004 | Laurila | .......................... | 345/169 |
| 6,822,585 B1 | 11/2004 | Ni et al. | | |
| 6,848,080 B1 * | 1/2005 | Lee et al. | ....................... | 715/203 |
| 6,864,809 B2 * | 3/2005 | O'Dell et al. | .................... | 341/28 |
| 7,061,403 B2 * | 6/2006 | Fux | ................................. | 341/28 |
| 7,218,781 B2 * | 5/2007 | van Meurs | ..................... | 382/185 |
| 7,257,528 B1 * | 8/2007 | Ritchie et al. | ..................... | 704/7 |
| 7,385,531 B2 * | 6/2008 | Zhang | .............................. | 341/28 |
| 7,395,203 B2 * | 7/2008 | Wu et al. | ........................ | 704/235 |
| 7,565,624 B2 * | 7/2009 | Fux et al. | ....................... | 715/816 |
| 2002/0045463 A1 | 4/2002 | Chen et al. | | |
| 2003/0023420 A1 | 1/2003 | Goodman | | |
| 2003/0038735 A1 * | 2/2003 | Blumberg | ........................ | 341/22 |
| 2003/0093263 A1 * | 5/2003 | Chen et al. | ..................... | 704/10 |
| 2004/0004558 A1 * | 1/2004 | Fux | ................................. | 341/22 |
| 2004/0006458 A1 * | 1/2004 | Fux et al. | ........................... | 704/8 |
| 2004/0239534 A1 * | 12/2004 | Kushler et al. | .................. | 341/28 |
| 2005/0027524 A1 | 2/2005 | Wu et al. | | |
| 2005/0027534 A1 * | 2/2005 | Meurs et al. | .................. | 704/270 |

(Continued)

FOREIGN PATENT DOCUMENTS

WO 2005039064 4/2005
WO 2005119512 12/2005

OTHER PUBLICATIONS

Office Action for Application No. 2653823, from the Canadian Intellectual Property Office, dated Aug. 26, 2011.

*Primary Examiner* — Jason Mandeville
(74) *Attorney, Agent, or Firm* — Finnegan, Henderson, Farabow, Garrett & Dunner, LLP

(57) ABSTRACT

An improved method of learning a context of a segment of text input enables facilitated text input on an improved handheld electronic device. In response to a series of inputs, segments and other objects are analyzed to generate a proposed character interpretation of the series of inputs. Responsive to detecting a replacement of a segment of the character interpretation with another segment, a combination object comprising the another segment and a preceding object is stored. In response to another series of inputs, the combination object can be employed by a processing algorithm to ascertain a preference for the another segment in the context of the preceding object of the combination object.

11 Claims, 6 Drawing Sheets

U.S. PATENT DOCUMENTS

| | | | |
|---|---|---|---|
| 2005/0144566 A1* | 6/2005 | Zhang | 715/810 |
| 2005/0162395 A1* | 7/2005 | Unruh | 345/169 |
| 2006/0221057 A1* | 10/2006 | Fux et al. | 345/169 |
| 2007/0110222 A1* | 5/2007 | Kim | 379/355.07 |
| 2008/0004860 A1* | 1/2008 | Fux et al. | 704/2 |
| 2008/0235003 A1* | 9/2008 | Lai et al. | 704/8 |
| 2009/0058814 A1* | 3/2009 | Rubanovich et al. | 345/169 |
| 2009/0089666 A1* | 4/2009 | White et al. | 715/257 |
| 2009/0119582 A1* | 5/2009 | Elizarov et al. | 715/261 |
| 2011/0219337 A1* | 9/2011 | Fux et al. | 715/816 |

* cited by examiner

METHOD OF LEARNING A CONTEXT OF A SEGMENT OF TEXT, AND ASSOCIATED HANDHELD ELECTRONIC DEVICE

BACKGROUND

1. Field

The disclosed and claimed concept relates generally to handheld electronic devices and, more particularly, to a method of learning a context for a character segment during text input.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

In certain circumstances, a handheld electronic device having a keypad of Latin letters can be employed to enter text in languages that are not based upon Latin letters. For instance, pinyin Chinese is a type of phonetic Chinese "alphabet" which enables transcription between Latin text and Standard Mandarin text. Pinyin Chinese can thus enable the input of Standard Mandarin characters by entering Latin letters. A "pin" is a phonetic sound, oftentimes formed from a plurality of Latin letters, and each pin is associated with one or more Standard Mandarin characters. More than four hundred pins exist, and each pin typically corresponds with a plurality of different Standard Mandarin characters. While methods and devices for text input such as pinyin Chinese text input have been generally effective for their intended purposes, such methods and devices have not been without limitation.

Generally each Standard Mandarin character is itself a Chinese word. Moreover, a given Standard Mandarin character in combination with one or more other Standard Mandarin characters can constitute a different word. An exemplary pin could be phonetically characterized as "da", which would be input on a Latin keyboard by actuating the <D> key followed by an actuation of the <A> key. However, the pin "da" corresponds with a plurality of different Chinese characters. Moreover, the pin "da" can be a single syllable represented by a character within a Chinese word having a plurality of syllables, with each syllable being represented by a Standard Mandarin character. As such, substantial difficulty exits in determining which specific Standard Mandarin character should be output in response to an input of a pin when the pin corresponds with a plurality of Standard Mandarin characters.

Numerous methodologies have been developed to assist in generating a character interpretation for a series of pins that have been input on a device. For instance, an exemplary algorithm would be the "simple maximum matching" algorithm, which is one algorithm among many, both simple and complex, of the well known Maximum Matching Algorithm. A given device may have stored thereon a number of Chinese words comprised of one or more Chinese characters, and the algorithm(s) executed on the device may employ such linguistic data to develop the best possible character interpretation of a series of input pins.

In response to the inputting of a sequence of pins, the aforementioned simple maximum matching algorithm might generate a character interpretation comprising the largest Chinese words, i.e., the words having the greatest quantity of Standard Mandarin characters. For example, the algorithm might, as a first step, obtain the largest Chinese word having characters that correspond with the pins at the beginning of the pin sequence. As a second step, the algorithm might obtain the largest Chinese word having characters that correspond with the pins in the sequence that immediately follow the previous word. This is repeated until Chinese words have been obtained for all of the pins in the input sequence. The result is then output.

Numerous other algorithms are employed individually or in combination with the objective of providing as a proposed output a character interpretation that matches what was originally intended by the user. It would be desired to provide an improved method and handheld electronic device that facilitate the input of text.

BRIEF DESCRIPTION OF THE DRAWINGS

A full understanding of the disclosed and claimed concept can be obtained from the following Description when read in conjunction with the accompanying drawings in which:

Similar numerals refer to similar parts throughout the specification.

DESCRIPTION

Figure 1:
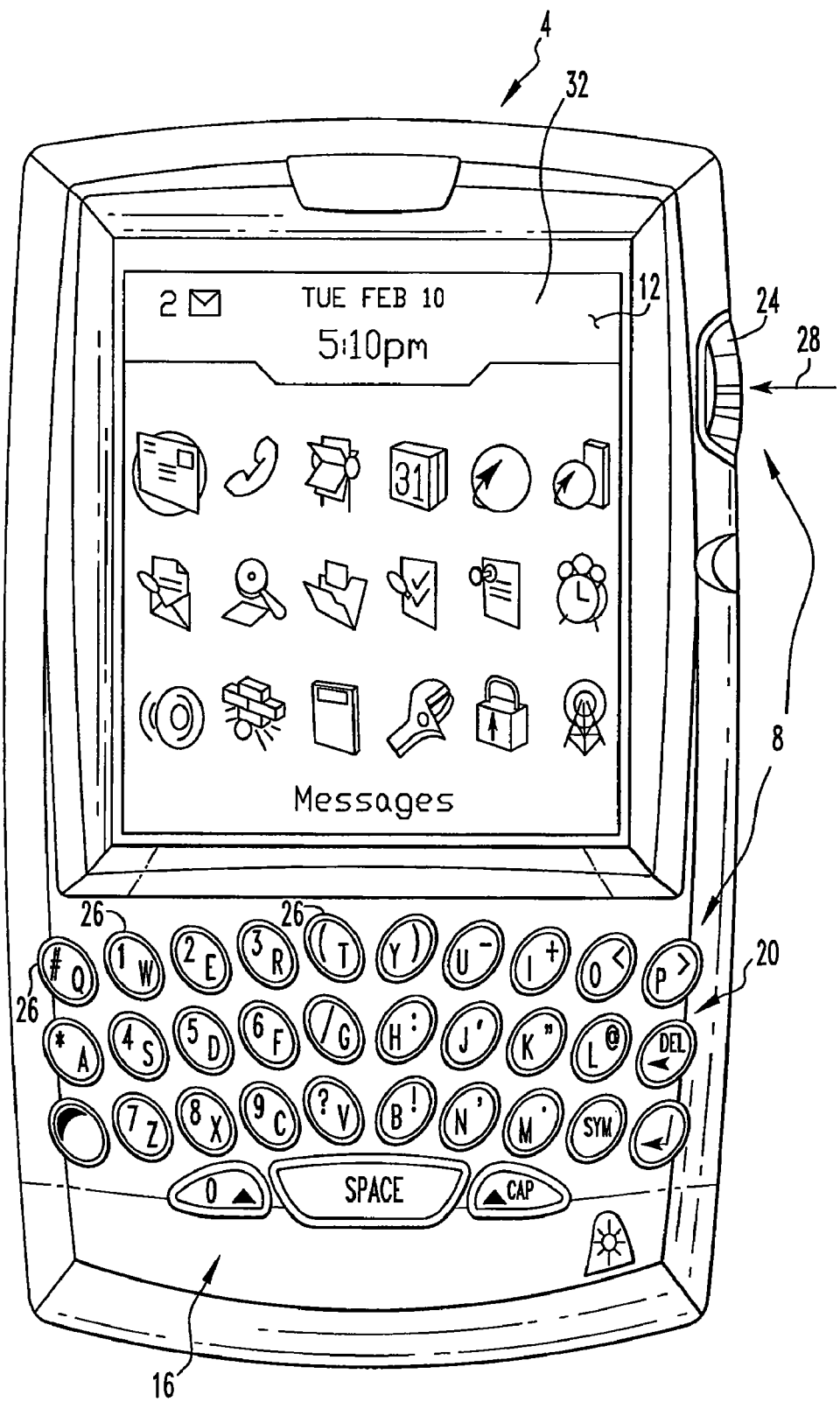
FIG. 1 is a front elevational view of an exemplary handheld electronic device in accordance with the disclosed and claimed concept upon which is performed an improved method in accordance with the disclosed and claimed concept.
Figure 2:
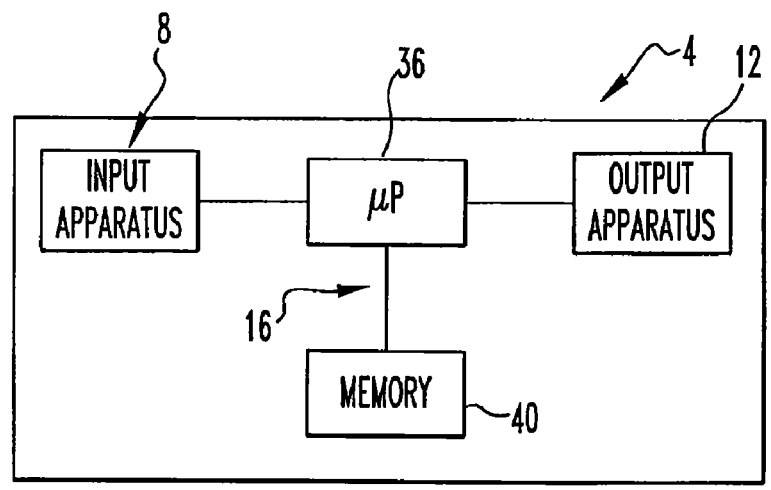
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The improved handheld electronic device 4 comprised an input apparatus 8, an output apparatus 12, and a processor apparatus 16. The input apparatus 8 provides input to the processor apparatus 16. The processor apparatus 16 provides output signals to the output apparatus 12.

The handheld electronic device and the associated method described herein advantageously enable the input of text. The exemplary device and method are described herein in terms of pinyin Chinese, but it is understood that the teachings herein can be employed in conjunction with other types of text input, and can be employed in conjunction with other languages such as Japanese and Korean, without limitation.

The input apparatus 8 comprises a keypad 20 and a thumbwheel 24. The keypad 20 in the exemplary embodiment depicted herein is a Latin keypad comprising a plurality of keys 26 that are each actuatable to input to the processor apparatus 16 the Latin character indicated thereon. The thumbwheel 24 is rotatable to provide navigational and other input to the processor apparatus 16, and additionally is translatable in the direction of the arrow 28 of FIG. 1 to provide other input, such as selection inputs. The keys 26 and the thumbwheel 24 serve as input members which are actuatable to provide input to the processor apparatus 16. The exemplary output apparatus 12 comprises a display 32.

Examples of other input members not expressly depicted herein would include, for instance, a mouse or trackball for providing navigational inputs, such as could be reflected by movement of a cursor on the display 32, and other inputs such as selection inputs. Still other exemplary input members would include a touch-sensitive display, a stylus pen for making menu input selections on a touch-sensitive display displaying menu options and/or soft buttons of a graphical user interface (GUI), hard buttons disposed on a case of the handheld electronic device 4, an so on. Examples of other output devices would include a touch-sensitive display, an audio speaker, and so on.

An exemplary mouse or trackball would likely advantageously be of a type that provides various types of navigational inputs. For instance, a mouse or trackball could provide navigational inputs in both vertical and horizontal directions with respect to the display 32, which can facilitate input by the user.

The processor apparatus 16 comprises a processor 36 and a memory 40. The processor 36 may be, for example and without limitation, a microprocessor (μP) at interfaces with the memory 40. The memory 40 can be any one or more of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory.

Figure 3:
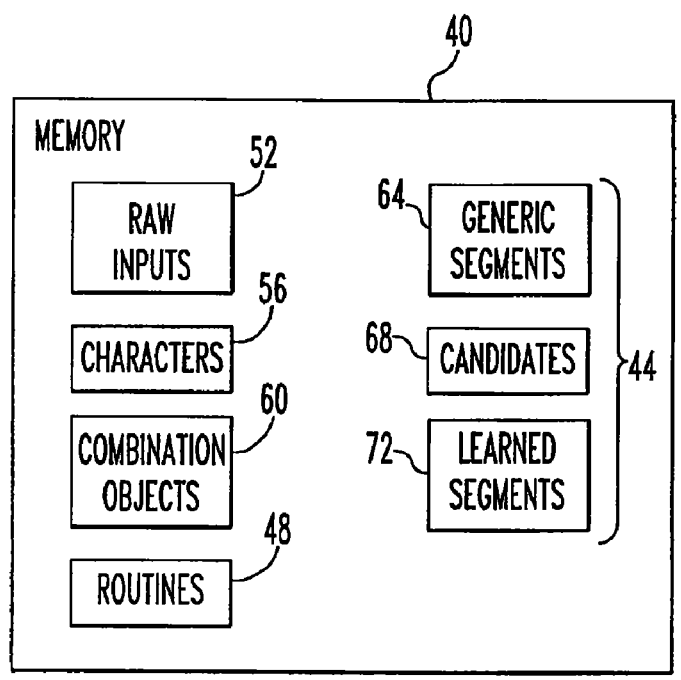
FIG. 3 is a schematic depiction of a portion of the handheld electronic device of FIG. 1.

The memory 40 is depicted schematically in FIG. 3. The memory 40 has stored therein a plurality of objects 44 and a number of routines 48. The routines 48 are executable on the processor 36.

The objects 44 comprise a plurality of raw inputs 52, a plurality of characters 56, a plurality of combination objects 60, a plurality of generic segments 64, a number of candidates 68, and a number of learned segments 72. As employed herein, the expression "a number of" and variations thereof shall refer broadly to a nonzero quantity, including a quantity of one. The exemplary memory 40 is depicted as having stored therein at least a first candidate 68 and at least a first learned segment 72, although it is understood that the memory 40 need not at all times comprise candidates 68 and/or learned segments 72. For instance, the handheld electronic device 4, when new, may not yet have stored in the memory 40 any candidates 68 or any learned segments 72, it being understood that one or more candidates 68 and/or learned segments 72 can become stored in the memory 40 with use of the handheld electronic device 4.

The raw inputs 52 and characters 56 may be stored in a table wherein each raw input 52 is associated with one or more of the characters 56. In the exemplary embodiment described herein, the exemplary language is Chinese, and thus each raw input 52 would be a pin in the scheme of pinyin Chinese. Associated with each such raw input 52, i.e., pin, would be one or more characters 56, i.e., Standard Mandarin characters.

The generic segments 64 each comprise a plurality of the characters 56. In the present exemplary embodiment, each possible two-character permutation of the Standard Mandarin characters is stored as a generic segment 64. Additionally, other Chinese words comprising three or more Standard Mandarin characters are each stored as a generic segment 64, based upon prevalent usage within the language. In the exemplary embodiment depicted herein, the generic segments 64 are each at most six Standard Mandarin characters in length, although only an extremely small number of generic segments 64 comprise six Standard Mandarin characters.

As will be described in greater detail below, the candidates 68 are each a series of Standard Mandarin characters that were the subject of an initial portion of a learning cycle, i.e., an object for which the learning cycle has not yet been completed. The learned segments 72 are each a plurality of Standard Mandarin characters which resulted from candidates 68 which went through an entire learning cycle. As a general matter, the generic segments 64 are inviolate, i.e., are not capable of being changed by the user, but the candidates 68 and the learned segments 72 are changeable based upon, for instance, usage of the handheld electronic device 4.

The routines 48 advantageously comprise a segment learning routine which enables the learning and storage of the learned segments 72, which facilitates text input. Specifically, the generic segments 64 provide a statistically-based solution to a text input, but the learned segments 72 advantageously provide a more customized user experience by providing additional segments, i.e., the learned segments 72, in response to certain inputs. This provides to the user a character interpretation that is more likely to be the character interpretation intended by the user than if the character interpretation were based solely on the generic segments 64.

Figure 4:
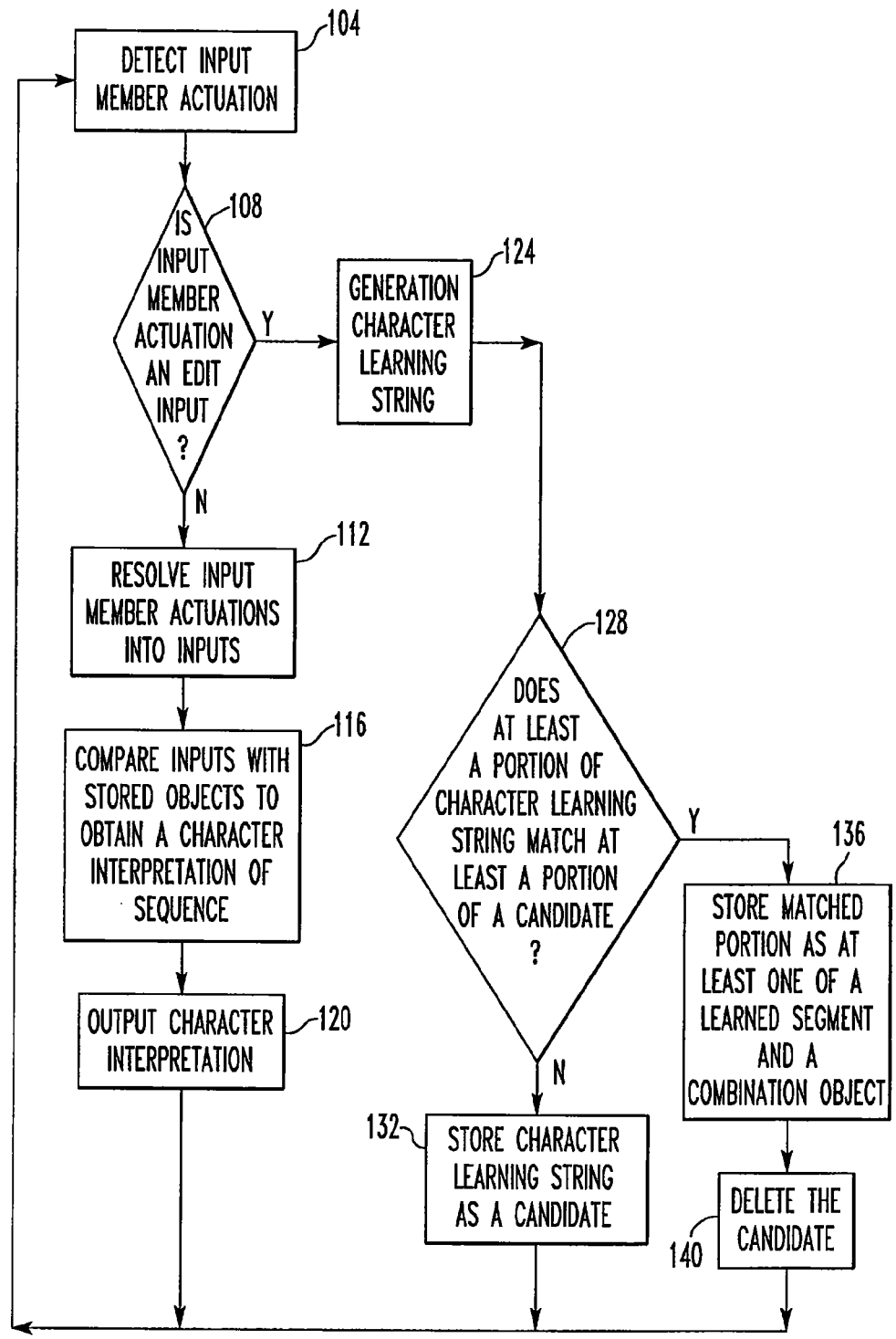
FIG. 4 is an exemplary flowchart depicting a portion of the improved method.

An exemplary flowchart in FIG. 4 depicts certain aspects of an improved learning method provided by the learning routine. The routine detects, as at 104, an actuation of an input member, such as one of the keys 26 or the thumbwheel 24. It is then determined, as at 108, whether the input member actuation was an edit input. If it is determined at 108 that the input member actuation was not an edit input, the process continues to 112 where the input member actuation and the preceding input member actuations in the current series of input member actuations are resolved into inputs. In the exemplary embodiment depicted herein, the inputs would each be pins since the exemplary language is pinyin Chinese. Since many pins are formed with a plurality of input member actuations, such as in the way the pin "da" is formed by an actuation of the <D> key 26 followed by an actuation of the <A> key 26, it is possible that a given input member actuation may not, by itself, constitute a new pin in the input sequence. Regardless, the various input member actuations are, to the extent possible, converted into inputs. In so doing, the raw inputs 52 may be employed.

Portions of the sequence of inputs obtained at 112 are then compared, as at 116, with various stored objects 44 in the memory 40 to obtain a character interpretation of the input sequence. That is, one or more of the raw inputs 52, characters 56, combination objects 60, generic segments 64, candidates 68, and learned segments 72 are consulted to determine the series of Standard Mandarin characters that are most likely to be the interpretation desired by the user. The input routine may employ algorithms from the Maximum Matching Algorithm, and/or other algorithms, for instance, to facilitate the identification of appropriate objects 44 from which to generate the character interpretation. The character interpretation is then output, as at 120.

Figure 5:
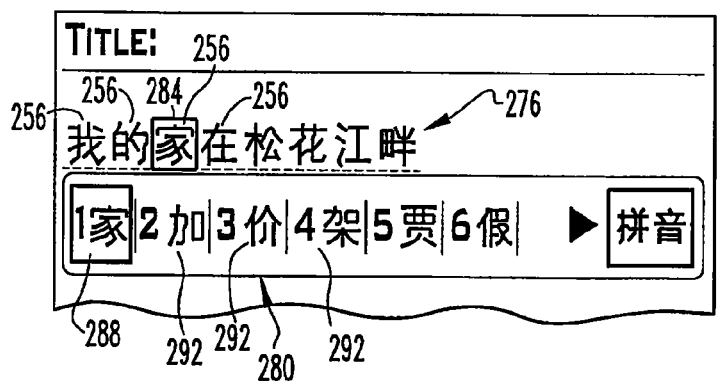
FIG. 5 is an exemplary output during an exemplary text input operation.

Such an exemplary output of a character interpretation is depicted generally in FIG. 5 at a text component 276 therein. The depicted text component 276 comprises a string of characters 256 that each correspond with an input, i.e., pin, of the input sequence. After the output at 120, processing thereafter continues to 104 where additional input member actuations can be detected.

If it was determined at 108 that the current input member actuation was an edit input, processing would continue to 124 where a character learning string would be generated. An editing input is depicted generally in FIGS. 5 and 6. Among the characters 256 in the text component 276 of FIG. 5 is an edited character 284, which is a character 256 that is the subject of the editing input. In FIG. 5, the edited character 284 is highlighted, meaning that the system focus is on the edited character 284. Since the edited character 284 has been highlighted and is thus the subject of editing, a variant component 280 is also output at a separate location on the display 32. The variant component 280 comprises as a default character 288 the edited character 284. The variant component 280 additionally includes a number of variant character 292. The default character 288 and the variant characters 292 in the depicted exemplary embodiment each are characters 256 that correspond with the pin with which the edited character 284 corresponds. That is, the default character 288 and the variant characters 292 each represent a character 256 that corresponds with the pin that was input at the indicated location within the input sequence. The edited character 284 was the character which resulted from the input algorithm(s) provided by the routines 48 on the handheld electronic device 4. The edited character 284 may become highlighted by moving a cursor over the particular character 256 and either translating the thumbwheel 24 in the direction of the arrow 28, by dwelling over the character 256, or through the use of other inputs recognizable by the appropriate routine 48.

Figure 6:
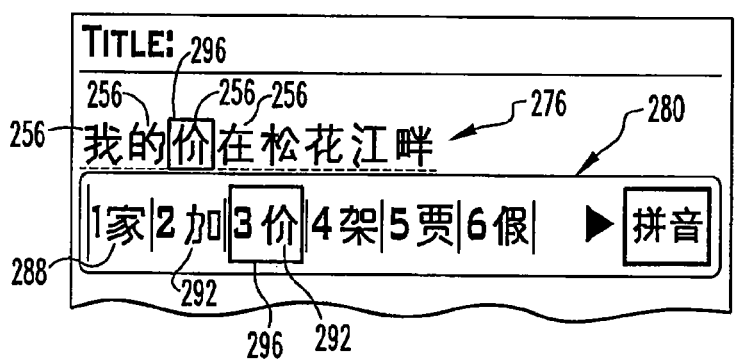
FIG. 6 is another exemplary output during the exemplary text input operation.

In FIG. 6, the user has selected one of the variant characters 292 as a replacement character 296 which will be used to take the place of the edited character 284. The replacement character 296 may have been selected through the use of a navigational input with the thumbwheel 24 or other such input. Upon highlighting the replacement character 296, the edited character 284 in the text component 276 is replaced with the replacement character 296. In the depicted exemplary embodiment, replacement of the edited character 284 with the replacement character 296 is finalized upon the translating the thumbwheel 24 in the direction of the arrow 28, or through the use of another appropriate input.

FIGS. 5 and 6 depict an edit input, i.e., the selection of an edited character 284 and the replacement thereof with a replacement character 296. Upon the detection of such an edit input, such as at 108, a character learning string is generated, as at 124. In the exemplary embodiment described herein, the character learning string comprises a string of the characters 256 in the text component 276. Specifically, the character learning string comprises the replacement character 296 plus up to four additional characters adjacent each side of the replacement character 296, i.e., up to four characters 256 preceding and up to four characters 256 following the replacement character 296. The learning character string thus can have, for example, up to nine characters. In the depicted exemplary embodiment, the characters of a character learning string are limited to characters within a single sentence. As can be understood from FIG. 6, the character learning string generated in response to the edit input depicted in FIGS. 5 and 6 would comprise the replacement character 296, the two Standard Mandarin characters to the left of the replacement character 296, and the first four Standard Mandarin to the right of the replacement character 296.

After the character learning string has been generated at 124, it is then determined at 128 whether or not any portion of the character learning string matches a portion of a candidate 68. In this regard, a "portion" comprises the replacement character 296 and at least one character adjacent thereto in the character learning string. It is determined at 128 whether these characters match a set of adjacent characters in one of the candidates 68.

If it is determined at 128 that no such match exists between a portion of the character learning string and a portion of a candidate 68, the character learning string is itself stored, as at 132, as a candidate 68. Processing thereafter continues at 104 where additional input member actuations can be detected.

If it is determined at 128 that the replacement character 296 and at least one character adjacent thereto in the character learning string match an adjacent plurality of characters in one of the candidates 68, the set of matched characters are learned, as at 136. If the quantity of matched characters are five characters in length or less, the set of characters are stored as a learned segment 72. However, if the set of matched characters is more than five characters in length, the set of matched characters is stored, by way of a combination object 60, as a learned segment 72 plus another object, either a character 56, a generic segment 64, or another learned segment 72. That is, some of the Standard Mandarin characters 56 in the set of matched characters are compared with various objects 44 to identify a matching object 44. Since the generic segments 64 comprise each two character permutation of the Standard Mandarin characters, at least the two initial characters of the set of matched characters can be stored in the form of a reference or pointer to the preexisting generic segment 64. The other characters 56 in the set of matched characters, i.e., the characters 56 other than the characters 56 for which a preexisting object 44 was identified, are stored as the learned segment 72. The resultant combination object 60 would, in the exemplary embodiment, include pointers to both the identified preexisting object 44 and the newly stored learned segment 72.

After the set of matched characters has been "learned", such as described above, the candidate 68 from which the matching characters were identified is deleted, as at 140. Processing thereafter returns to 104 where additional input member actuations can be detected.

The identification at 128 of a set of characters in the character learning string that match a set of characters in a candidate 68 can occur in any of a variety of fashions. In the exemplary embodiment depicted herein, the replacement character 296 in the character learning string plus at least one adjacent character in the character learning string must match a corresponding set of adjacent characters in a candidate 68. This can be accomplished, for example, by identifying among the candidates 68 all of the candidates 68 which comprise, as one of the characters thereof, the replacement character 296. The characters in the learning character string that precede the replacement character 296 and that follow the replacement character 296 thereof are compared with characters in a candidate 68 that are correspondingly positioned with respect to the character thereof that matches the replacement character 296. In the depicted exemplary embodiment, the comparison occurs one character at a time alternating between characters that precede and that follow the replacement character 296 in a direction progressing generally outwardly from the replacement character 296.

For example, the character learning string generated from the edit input depicted in FIGS. 5 and 6 could be characterized as the string $C_3C_1C_RC_2C_4C_5C_6$. The character designed $C_R$ could be said to represent the replacement character 296, the characters $C_3C_1$ could be the two characters in FIG. 6 that precede, i.e., appear to the left of, the replacement character 296, and the characters $C_2C_4C_5C_6$ would represent the four characters that follow, i.e., appear to the right of, the replacement character 296. In the depicted exemplary embodiment, if $C_R$ matches a character in one of the candidates 68, the character $C_1$ would be compared with a correspondingly positioned character in the candidate 68 that is being analyzed. If the character $C_1$ matched the indicated character of the candidate 68, it would then be determined whether or not the character $C_2$ of the character learning string matched the correspondingly positioned character in the candidate 68 being analyzed. Such character analysis would alternate between the characters preceding and following the replacement character 296 in the character learning string until a non-matching character is identified at one side of the replacement character 296, or if no correspondingly positioned character exists in the candidate 68. Further comparisons are performed only at the opposite side of the replacement character 296 until either a non-matching character is identified or no further characters exist at such opposite side of the candidate 68.

The result is a set of characters from the character learning string for which a matching series of characters was found within one of the candidates 68. The set of matched characters is stored, as indicated above, and the candidate 68 from which the matching characters was identified is deleted, as at 140.

Upon such storage of the matched characters as a learned segment 72 and/or a combination object 60, the learned segment 72 and/or the combination object 60 can be employed in conjunction with further text input to generate proposed character interpretations of sequences of inputs. Since the user has already indicated twice a preference for the set of matched characters, i.e., the characters were stored initially as a candidate 68 and were thereafter stored within a character learning string which was compared with the candidate 68, the user has indicated a desire to use the set of matched characters.

It is noted that the generic segments 64 and the learned segments 72 each comprise, in addition to the characters 56 thereof, a relative frequency value. In the exemplary depicted embodiment, the frequency value has a value between zero and seven, with higher values being indicative of relatively more frequent use. The learned segments 72 are each given a relatively high frequency value. As such, when at 116 a character interpretation of an input sequence is obtained, a preference will exist, as a general matter, for the learned segments 72 when both a learned segment 72 and a generic segment 64 would constitute a valid character interpretation of a given set of adjacent inputs. As such, as the user continues to use the handheld electronic device 4, progressively greater quantities of learned segments 72 are stored, and character interpretations of input sequences progressively have a greater likelihood of being the character interpretation intended by the user.

Figure 7:
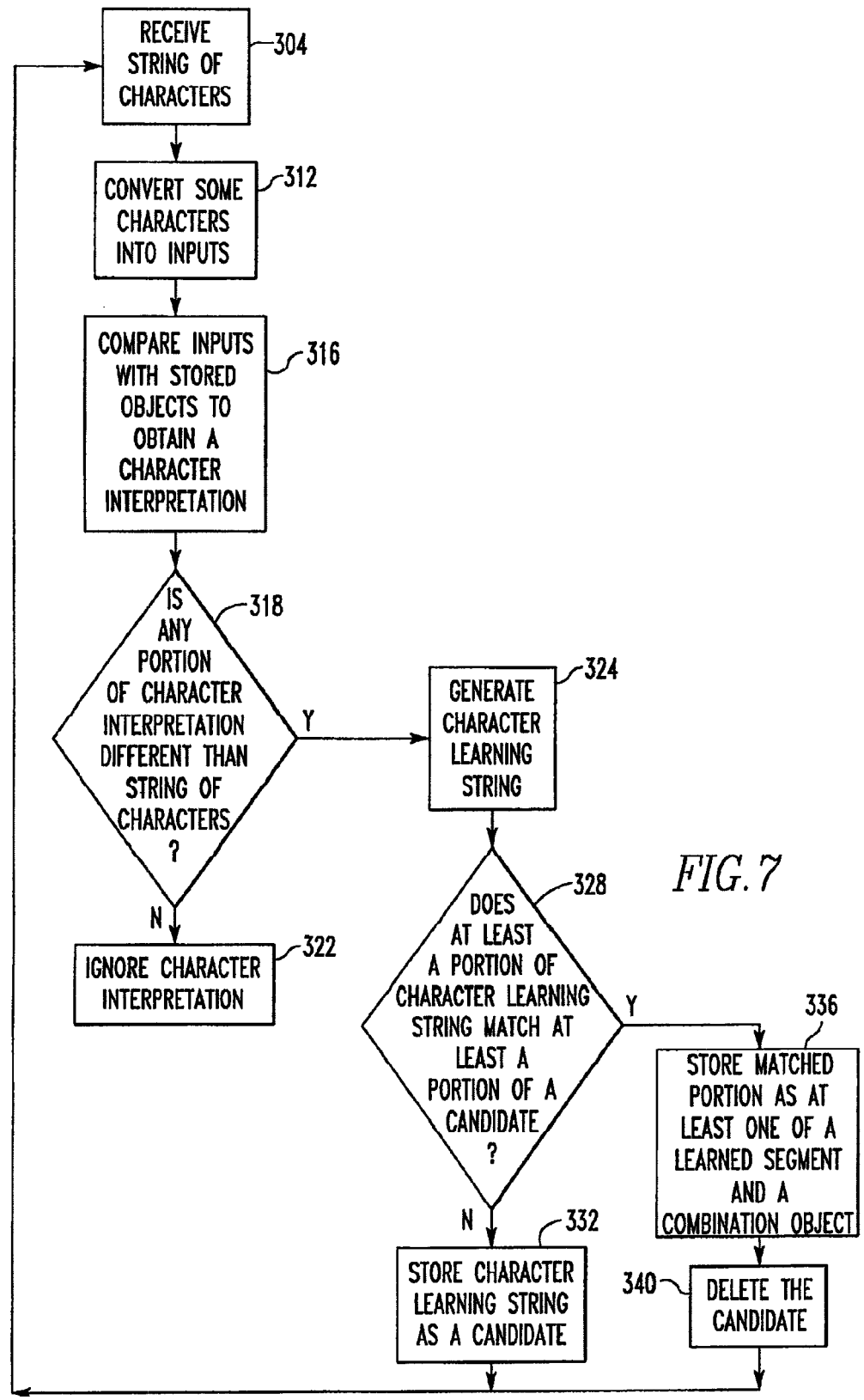
FIG. 7 is an exemplary flowchart depicting another portion of the improved method.

Learned segments 72 and combination objects 60 can additionally be derived from text received in other fashions on the handheld electronic device. For instance, the exemplary handheld electronic device 4 can receive messages, such as in the form email, or as messages such through the use of short message service (SMS). As can be understood from FIG. 7, such received text can be generally said to be subjected to the input method generally described above and depicted in FIG. 4. Specifically, a string of characters is received, as at 304, on the handheld electronic device 4. The characters of the string of characters might be referred to as reference characters due to their later use in a comparison operation. At least some of the characters are converted into raw inputs 52, as at 312. Typically, a single sentence is converted at one time, although other schemes can be employed for determining which portions of the text to convert into raw inputs 52.

The string of raw inputs 52 is then compared, as at 316, with certain of the objects 44 in the memory 40 in order to obtain a character interpretation of the raw inputs 52. It is then determined, as at 318 whether any portion of the character interpretation is different than the string of reference characters received at 304 and which were converted into raw inputs 52 at 312. If it is determined at 318 that the character interpretation is the same as the received string of reference characters, the character interpretation is ignored as at 322. Processing thereafter continues, as at 312, where additional characters, if any, are converted into raw inputs 52 for further processing as indicated above.

If it is determined at 318 that some of the characters 56 of the character interpretation differ from the characters in the string of characters obtained at 304, a character learning string is generated, as at 324. The character learning string generated at 324 comprises the characters in the string of characters obtained at 304 which were identified as differing between the character interpretation and the received string of reference characters. If desired, the character learning string can additionally include one or more characters in the string of characters that precede and/or follow the differing characters.

Once the character learning string has been generated, as at 324, it is determined at 328 whether at least a portion of the character learning string matches at least a portion of a candidate 68. This occurs in a fashion similar to the processing at 128. If no such match is found at 328, the character learning string is stored, as at 322, as a candidate 68. If, however, a set of matching characters is identified at 328, the matching characters are stored, as at 336, as at least one of a learned segment 72 and a combination object 60, in a fashion similar to the processing at 136. The candidate 68 from which the match was identified is then deleted, as at 340. After processing after 332 or at 340, processing thereafter continues at 312 where additional characters can be converted into raw inputs 52.

It thus can be seen that received text can be employed to learn new learn segments 72 and/or combination objects 60 in a fashion similar to the way in which learned segments 72 and combination objects 60 were learned during text input, as depicted generally in FIG. 4. Moreover, the received text and the input text can together be used to store new learned segments 72 and new combination objects 60. For instance, a candidate 68 stored at 332, i.e., during analysis of the received text, can be the candidate identified at 128 during the text input process. By the same token, a candidate 68 stored at 132, i.e., during text input, can be the candidate identified at 328 during analysis of received text. Of course, candidates 68 stored at 132 during text input can be matched at 128 during other text input, and candidates 68 stored at 332 during analysis of received text can be matched at 328 during analysis of other received text. This provides further customization of the handheld electronic device 4 to the needs of the user.

Figure 8:
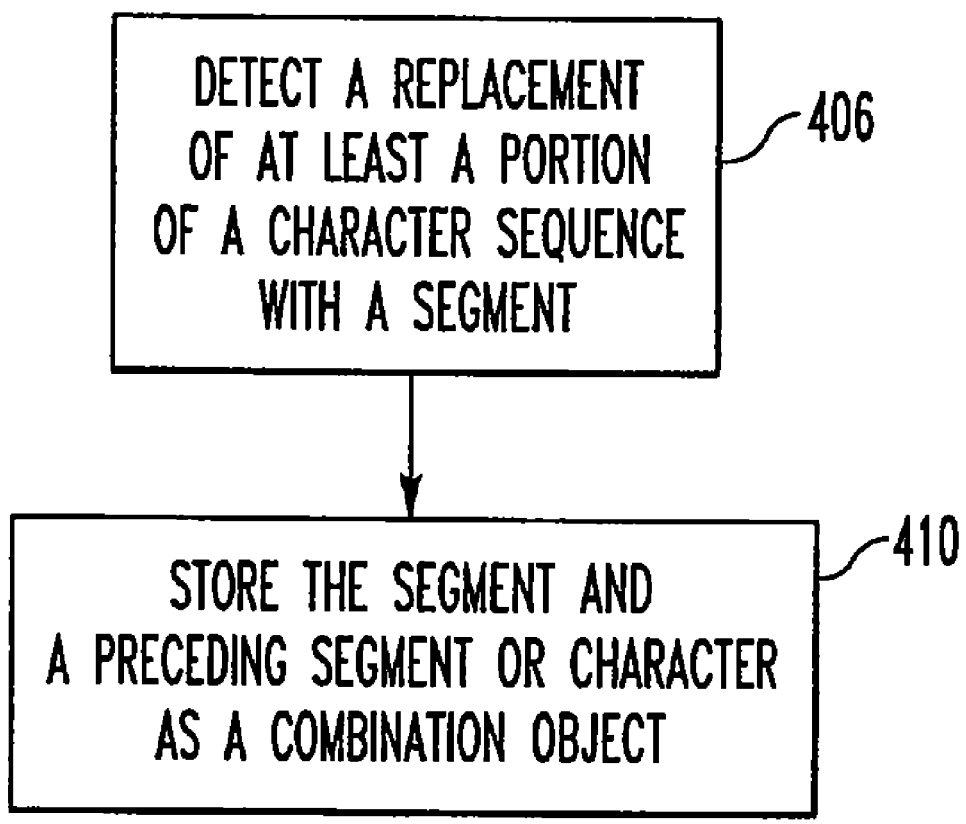
FIG. 8 is an exemplary flowchart depicting another portion of the improved method.

One of the routines 48 additionally provides a context learning feature when a plurality of adjacent characters 56 in a character interpretation are replaced with an existing segment, either a generic segment 64 or a learned segment 72, or are replaced with individual characters 56. Such a context learning feature is depicted as a flowchart in FIG. 8 and as a set of exemplary outputs in FIGS. 9 and 10. As can be understood from FIG. 8, a replacement of at least a portion of a character interpretation with a segment is detected, as at 406. Thereafter, the segment and either a preceding segment or a preceding character are stored as a combination object 60, as at 410.

Figure 9:
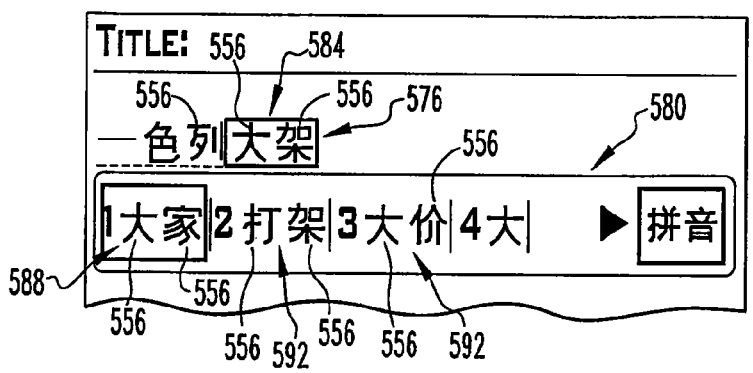
FIG. 9 is an exemplary output during another exemplary text input operation.
Figure 10:
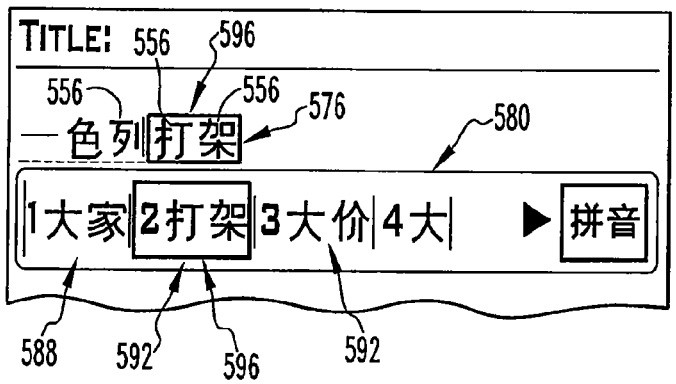
FIG. 10 is another exemplary output during the another exemplary text input operation.

Such an operation is depicted, for example, in FIGS. 9 and 10. In FIG. 9, a text component 576 is output and includes an edited segment 584 comprising two characters 556. In response to the edited segment 584 being highlighted, a variant component 580 is displayed and comprises a default segment 588 and a number of variant segments 592. In FIG. 10 the user has selected a replacement segment 596, which has replaced the edited segment 584. The replacement segment 596, plus a preceding object 44 in the text component 576 are stored as a combination object 60. That is, the new combination object 60 comprises the replacement segment 596 plus the object 44 that precedes the replacement segment 596. If what precedes the replacement segment 596 is another segment, the preceding segment is stored as a part of the new combination object 60. If the object 44 that precedes the replacement segment 596 is a character 556, i.e., a character 556 that is not part of a segment, the character 556 is stored as the other portion of the combination object 60.

The new combination object 60 thus can be employed by the input routine to determine whether a preference exists for one segment in the context of another object 44. For instance, the replacement segment 596 portion of the new combination object 60 might be selected over another segment that is a valid character interpretation of a part of a sequence of inputs when it follows the same character 556 or the other segment which preceded the replacement segment 596 during the aforementioned context learning operation. The combination objects 60 thus provide a further level of customization for the user, and facilitate providing a character interpretation that matches the user's original intention.

As noted above, the context learning feature can be initiated when a plurality of adjacent characters 56 in a character interpretation are replaced with other individual characters 56. If a particular character 56 in a string of characters is replaced with another particular character 56 as a result of an editing input, a character learning string is generated, as at 124 in FIG. 4 and as is described elsewhere herein. Such a character learning string can be stored as a candidate, as at 132, or can be stored, in whole or in part, as at least one of a learned segment 72 and a combination object 60, as at 140. If, however, the user thereafter seeks to edit a character 56 adjacent the another particular character 56, the system will interpret the individual editing of two adjacent characters 56 as indicating a need to store a new segment. Processing therefore would immediately be transferred to 410 in FIG. 8, wherein the edited adjacent characters would be stored as a learned segment 72 and as a portion of a combination object 60. In a similar fashion, if a third adjacent character 56 was similarly individually edited, the three edited adjacent characters would be stored as a learned segment 72 and as a portion of a combination object 60.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method comprising:
   receiving, by a device, inputs corresponding to a first set of characters selected from a first alphabet;
   outputting, by the device, a second set of characters associated with the first set of characters, the second set of characters being selected from a second alphabet;
   receiving, by the device, a selection of one or more of the characters of the second set of characters;
   outputting, by the device, one or more replacement characters from the second alphabet;
   receiving, by the device, an editing input replacing the one or more of the characters of the second set of characters with the one or more replacement characters from the second alphabet;
   storing, by the device, a combination object comprising: a representation of the one or more replacement characters, and a representation of at least one of the characters from the second set of characters, different from the one or more replacement characters;
   determining a frequency with which the characters represented by the combination object are used together based on user inputs; and
   providing the characters represented by the combination object together, in response to one or more subsequent inputs, based on the frequency.

2. The method of claim 1, wherein the characters different from the one or more replacement characters precede the one or more replacement characters in the second set of characters.

3. The method of claim 1, further comprising:
   receiving subsequent inputs identifying the characters represented by the combination object; and
   categorizing the characters represented by the combination object as a learned segment of characters.

4. The method of claim 1, wherein the combination object is stored after receiving the editing input.

5. A handheld electronic device comprising:
   a processor; and
   a memory comprising instructions executable by the processor to perform operations comprising:
      receiving inputs corresponding to a first set of characters selected from a first alphabet;
      outputting a second set of characters associated with the first set of characters, the second set of characters being selected from a second alphabet;
      receiving, by the device, a selection of one or more of the characters of the second set of characters;
      outputting, by the device, one or more replacement characters from the second alphabet;
      receiving, by the device, an editing input replacing the one or more of the characters of the second set of characters with the one or more replacement characters from the second alphabet;
      storing a combination object comprising: a representation of the one or more replacement characters, and a representation of at least one of the characters from the second set of characters, different from the one or more replacement characters;
      determining a frequency with which the characters represented by the combination object are used together based on user inputs; and
      providing the characters represented by the combination object together, in response to one or more subsequent inputs, based on the frequency.

6. The handheld electronic device of claim 5, wherein the characters different from the one or more replacement characters precede the one or more replacement characters in the second set of characters.

7. The handheld electronic device of claim 5 wherein the operations further comprise:
   receiving subsequent inputs identifying the characters represented by the combination object; and categorizing the characters represented by the combination object as a learned segment of characters.

8. The handheld electronic device of claim 5 wherein the combination object is stored after receiving the editing input.

9. The method according to claim 1, wherein:
the inputs identify several characters from the first alphabet that correspond to a single character from the second alphabet.

10. The method according to claim 9, wherein the first alphabet is the Latin alphabet, and the second alphabet includes Mandarin Chinese characters.

11. The method according to claim 10, wherein the several characters from the Latin alphabet comprise a pin corresponding to a single Mandarin Chinese character.

* * * * *